United States Patent [19]

Spink et al.

[11] Patent Number: 4,889,694
[45] Date of Patent: Dec. 26, 1989

[54] RECOVERY OF ZINC VALUES FROM ZINC AND IRON-BEARING SULFIDE MATERIALS

[75] Inventors: Donald R. Spink, Waterloo; Jerry Y. Stein, Thornhill, both of Canada

[73] Assignee: University of Waterloo, Waterloo, Canada

[21] Appl. No.: 194,158

[22] Filed: May 16, 1988

Related U.S. Application Data

[63] Continuation-in-part of Ser. No. 829,927, Feb. 18, 1986, abandoned.

[30] Foreign Application Priority Data

Feb. 20, 1985 [GB] United Kingdom ................. 8504364

[51] Int. Cl.⁴ ........................ C01G 9/03; C01G 49/02
[52] U.S. Cl. .................................... 423/110; 423/109; 423/150; 423/153; 423/622; 423/632; 75/6; 75/7; 75/9; 75/101 R; 75/120; 75/121; 204/114
[58] Field of Search .................... 423/27, 47, 109, 110, 423/140, 150, 153, 632, 622; 75/2, 6, 3, 9, 101 R, 108, 109, 117, 119, 120, 121; 204/114

[56] References Cited

U.S. PATENT DOCUMENTS

| | | | |
|---|---|---|---|
| 1,749,125 | 10/1930 | Brinker | 423/110 |
| 2,797,987 | 7/1957 | Quintin | 423/110 |
| 3,181,944 | 5/1965 | Brooks et al. | 423/99 |
| 3,515,510 | 6/1970 | Winter | 423/109 |
| 3,857,767 | 12/1974 | Gabler, Jr. et al. | 423/150 |
| 4,071,357 | 1/1978 | Peters | 75/109 |
| 4,105,743 | 8/1978 | Reinhardt et al. | 423/105 |
| 4,124,462 | 1/1979 | Reinhardt et al. | 204/119 |
| 4,168,969 | 9/1979 | Pepper et al. | 75/118 R |
| 4,201,748 | 5/1980 | Swinkels et al. | 423/150 |
| 4,242,124 | 12/1980 | Makipurtti | 75/6 |
| 4,440,569 | 4/1984 | Weir et al. | 75/120 |
| 4,497,778 | 2/1985 | Pooley | 423/27 |
| 4,585,477 | 4/1986 | Mioen | 75/117 |

FOREIGN PATENT DOCUMENTS

| | | | |
|---|---|---|---|
| 1177257 | 11/1984 | Canada | 423/110 |
| 401328 | 4/1928 | Fed. Rep. of Germany | |
| 1199506 | 8/1965 | Fed. Rep. of Germany | |

OTHER PUBLICATIONS

J. Kruger et al, "Das Eisenproblem bei der hydrometallurgischen Zinkgewinnung" Erzmetall, vol. 33, No. 2, 1980 pp. 70–76; Weinheim.

J. Kruger et al, "Uberlegungen zum Eisenproblem bei der hydrometallurgischen Zinkgewinnung", Erzmetall, Vo. 34, No. 7/8, Jul. 1981 pp. 380–387; Weinheim.

Teruo Suzuka, Patents Abstracts of Japan–vol. 8, No. 102 (C-222) (1539), May 12, 1984, JP-A-59 16 919.

M. M. Lakernik and G. N. Pakhomova, Zinc and Cadmium Metallurgy, Metallurgia Publishers, Moscow 1969, pp. 81–111 and 250–262.

*Primary Examiner*—Robert L. Stoll
*Attorney, Agent, or Firm*—Sim & McBurney

[57] ABSTRACT

Iron-containing zinc sulfide concentrate is processed to recover zinc values therefrom. The concentrate is roasted to convert zinc sulfide and iron sulfide to their oxides while adequate sulfide-sulfur is retained to maintain the iron values in the ferrous state and thereby avoid ferrite formation. Zinc oxide and iron oxide values are recovered from the roast, simultaneously or sequentially, and residual zinc sulfide may be recycled to the roasting step.

46 Claims, 5 Drawing Sheets

RECOVERY OF ZINC VALUES FROM ZINC AND IRON-BEARING SULFIDE MATERIALS

REFERENCE TO RELATED APPLICATION

This application is a continuation-in-part of copending U.S. patent application Ser. No. 829,927 filed Feb. 18, 1986, now abandoned.

FIELD OF INVENTION

This invention relates to an improved technique for treating iron bearing zinc sulfide concentrates, or the like, for the recovery of zinc values therefrom. Briefly, the invention relies on the fact that, in a controlled oxidizing atmosphere when sufficient amounts of residual sulfide-sulfur are retained in the resultant partially desulfurized product, the iron content can be maintained substantially in its ferrous state during the roasting step, irrespective of the type of the concentrate or ore employed, thus precluding any possibility of ferrite formation in which the ferric state of iron is required More particularly, the present invention relates to a new and improved process for roasting zinc sulfide concentrates, or the like, of low to high iron content to produce a zinc ferrite-free partially-desulfurized zinc concentrate suitable for subsequent hydrometal-lurgical treatment and concomitantly a high-strength $SO_2$-laden off-gas substantially free of oxygen, thus containing little or no $SO_3$ gas, suitable for the economical production of sulfuric acid, sulfite for the wood pulp industry, and other sulfur-based products.

BACKGROUND TO THE INVENTION

In the metal industry, one of the most challenging problems is the avoidance of ferrite formation while producing high grade calcine from iron-bearing base zinc sulfide concentrates. In the present state of the art, the production of a high grade metal calcine without concomitant formation of ferrites requires very demanding roast conditions and the employment of strong reducing gases, such as $CO, H_2$, etc., which by their nature also can reduce metal oxides to metals. These ferrite elimination methods, while technically satisfactory when properly controlled, are inherently very cost intensive. To our knowledge, no-one is employing such methods commercially today.

The necessity for minimizing the formation of ferrite resides in the fact that ferrites, which are co-produced during normal high temperature roasting processes by combination of ferric oxide with other metal oxides, are insoluble in the relatively dilute mineral acids commonly employed for leaching metal values from the calcine. In the case of zinc processing, this lack of solubility of ferrites means that the solids residue remaining after the leaching step contains a significant concentration of zinc which, if no steps were taken to recover it, would represent a loss to the process and significantly affect the overall efficiency of the leaching process Steps that can be taken to liberate the non-ferrous metals in the ferrite usually involve leaching with stronger mineral acid under very intensified leach conditions. The problem with such a leach is that the associated iron values in the ferrite are also co-dissolved and must subsequently be removed and disposed of prior to further beneficiation. For example, in the production of electrolytic zinc, maximum solubility of zinc content of the calcine in the leach liquor is essential, as this has a profound effect on the efficiency and economics of the process. In practice, this implies that the formation of zinc ferrite needs to be minimized during roasting to avoid necessary retreatment of leach residues to recover the zinc This proves difficult to accomplish in practice and does not, therefore, yield the desired results as the formation of zinc ferrite is unavoidable due to its formation being favoured thermodynamically under normal roasting conditions.

While the disadvantages of ferrite formation during roasting may have been altered now with the advent of Jerosite, Goethite and Hematite selective precipitation processes which made it possible and commercially feasible to deal with soluble iron, these iron handling techniques are quite costly as is the intensified leach step which solubilizes the ferrites. It should be recognized that the higher the iron level is in the concentrate, the higher will be the zinc ferrite fraction formed in the calcine, the lower will be the overall extraction of metal during normal leaching, and the more important and costly these iron handling steps will become. It is therefore, clear that a process which would reduce ferritization of base metals, particularly zinc, would represent a marked improvement in the art.

A search has been conducted with respect to the present invention. The following U.S. Pat. Nos. have been located as the closest prior art: 692,148; 872,822; 875,332; 1,401,733; 1,463,901; 1,874,370; 1,930,370; 1,940,912; 3,095,363; 3,181,944; 3,346,364; 3,758,293; 4,201,748; 4,231,791; 4,238,222 and 4,437,884. The applicants do not believe that any one of these references discloses or suggests the present invention.

Additional prior art also is known to the applicants from the prosecution of the aforesaid precursor application Ser. No. 829,927 as follows:

German AS No. 1,199,506 describes a method of recovering zinc from zinc-containing sulfidic ores by roasting the sulfidic ore, solubilizing zinc values and electrolytically producing metallic zinc from the resulting zinc-salt solution. The reference mentions the problem of zinc ferrite formation at high temperatures and long residence times and a desire to avoid the formation of zinc ferrite.

The reference further describes, as prior art, a wet procedure in which zinc-containing sulfidic ore is treated with sulfuric acid and free oxygen under pressure to solubilize the zinc as zinc sulphate while the sulfide sulfur is oxidized to elementary sulfur.

The procedure adopted in the German reference is to effect an initial roasting operation at a temperature which, at a very maximum is 850° C. and preferably is between 750° and 800° C. At those temperatures, it is indicated that only 60 to 90% of the initial sulfide sulfur can be oxidized to $SO_2$ and then only at relatively slow rates of reaction The residue then is subjected to the oxidative pressure leaching with sulphuric acid in the presence of free oxygen at a temperature above the melting point of sulfur to solubilize the zinc values as zinc sulfate and to convert the residual sulfide sulfur to elemental sulfur. Zinc then is recovered from the leachate.

The use of the temperatures below 850° C. is said to ensure the absence of zinc ferrite formation during the roasting operation. In the present invention, the process is carried out under conventional zinc sulfide roaster conditions of at least about 900° C. and yet zinc ferrite formation is suppressed.

U.S. Pat. No. 3,181,944 also mentions the ferrite formation problem discussed above. The reference purports to describe the roasting of zinc sulfide ores to produce a calcine lower in residual zinc sulfide, zinc sulfate and ferrites, to increase the solubility of the zinc content of the calcine and increase the yield of recoverable zinc. This result is achieved by using a specific fluidized bed procedure at a temperature of approximately 800° to 900° C. in which a substantially complete roast is effected and significant ferrite formation occurs. By contrast, the present invention avoids such ferrite formation without the elaborate processing described in this prior art.

SUMMARY OF INVENTION

The present invention is directed towards the provisions of a simple, easily practiced, continuous method of producing, from an iron-bearing zinc sulfide material, a quality calcine which contains a minimal amount of ferrite and sulfate.

In accordance with the present invention, there is provided a novel process of treating iron-bearing zinc sulfide materials, including ores and concentrates. In a first step, the zinc sulfide material is contacted with an oxidizing gas containing molecular oxygen at a temperature of at least about 900° C. and below the sintering temperature of said material to convert zinc and iron values contained in the material to oxide form. Residual sulfide-sulfur is retained during the contacting step and in the product resulting therefrom in sufficient amount that at least about 90% of the iron values are present in the roasted product in the form of ferrous oxide. The presence of the residual sulfide sulfur ensures that the formation of zinc ferrites and sulfates is minimized, since the iron oxide is present substantially in ferrous form. In a second step, the partially-desulfurized product which results from the contacting step and having residual sulfide sulfur values is treated to recover the zinc values and iron values present in oxide form in the partially-desulfurized product while retaining zinc values in sulfide form in the product.

The treatment of the partially-desulfurized material to remove zinc oxide values and ferrous iron oxides may be effected simultaneously, for example, by leaching with dilute sulfuric acid or aqueous sulfur dioxide solution, or may be effected sequentially, for example, by first leaching the partially-desulfurized material to selectively dissolve the zinc oxide, such as by the use of aqueous ammoniacal ammonium carbonate solution, followed by leaching to dissolve the ferrous iron oxide, such as by the use of dilute sulphuric acid or aqueous sulphur dioxide. The undissolved residual zinc sulfide may be recycled to the contacting step to achieve an overall high yield of zinc values.

In spite of the efforts made and the many methods devised, it has not heretofore been found possible or practicable, so far as we are aware, to regulate or control the roasting reactions in the roaster in a way to substantially minimize the formation of ferrites, such as is effected in this invention, since optimum roasting conditions to obtain a quality of calcine considered acceptable, namely low residual sulfide-sulfur and sulfate-sulfur values, also frequently leads to the formation of zinc ferrite during the roasting operation and concomitantly to high oxygen levels in the $SO_2$-laden off-gases.

In contrast to this conventional thinking, the applicants have refrained from completely oxidizing sulfide values to produce a so-called "dead" roast, but rather have deliberately retained sulfide sulfur values so as to maintain the iron values in ferrous form and thereby discourage ferrite formation. In addition to ensuring that the iron values are in ferrous form in the partially-desulfurized product, the excess sulfide-sulfur also ensures that any sulfates initially present in the zinc sulfide material or subsequently formed during the roasting step are reduced to sulfur dioxide and similarly any ferric iron initially present in the zinc sulfide material or subsequently formed during the roasting step is reduced to ferrous iron.

It is not possible, of course, to ensure that 100.00% percent of the iron values of the zinc sulfide material are converted to and maintained as ferrous oxide. However, at least 90 wt. % and preferably at least 95% of the iron values contained in the zinc sulfide material form ferrous oxide and hence the quantity of iron values in ferric form is quite small and the opportunity for ferrite formation is similarly minimal. On the other hand, any zinc ferrite which is formed remains in the leach residue which is eventually returned to the roaster, where some or all of it is converted to ZnO and Feo.

BRIEF DESCRIPTION OF DRAWINGS

FIGS. 4 (a and b) and 5 (a and b) are mass balances for typical processes according to the present invention for the cases where the residual sulfide concentration in the partially-desulfurized concentrate is 14.9 wt. % and 8.29 wt. % respectively.

GENERAL DESCRIPTION OF INVENTION

In the present invention, the prior art problems are overcome by conducting a partial desulfurization roast in a manner that does not result in the formation of ferrites, irrespective of the form of metal in the starting concentrate or ore, or other form of iron-bearing zinc sulfide material. By the practice of the process of the present invention, we have shown that it is possible (1) to avoid completely the formation of ferrites which, in turn, results in recovery of higher percentages of metal values than heretofore achieved in current practices, (2) to avoid the formation of sulfates, (3) to eliminate the strong and demanding leach conditions usually required when ferrites are present in the calcine, (4) to produce a more active calcine which decreases the number of leaching stages to recover the various values from the calcine to a fraction of that employed in current practices, (5) to concomitantly produce a high strength $SO_2$-laden off-gas, substantially free of oxygen (and thus the contaminating $SO_3$ gas), which is very suitable for economical production of sulfuric acid, (6) to carry out the roast in substantially smaller sized roasters than the commercially-available ones, or alternatively to employ higher throughputs in existing roaster as much shorter residence times are required, (7) to provide for easy and convenient control of the parameters and factors of the partial desulfurization reaction that lead to the avoidance of zinc ferrite formation, such as the residence time and temperature, and (8) to provide a technology that can easily and economically be integrated into commercially-available metal plants wherein sulfide concentrates are roasted prior to further treatment.

In the partial desulfurization roasting process of the invention, the roasting of zinc sulfide concentrates, typically assaying about 50 to 55% Zn, about 2 to 17% Fe, about 0.2 to 1% Cu, about 0.1 to 0.3% Cd and less than about 2% Pb, generally is effected to a degree of eliminating at least about 30% but no more than about 85% of the original sulfur of the concentrate, in order to retain a substantial amount of residual sulfur in the calcine ranging from about 5% to about 22% S, preferably about 8 to about 14% S. This excess of sulfide-sulfur, present at all times in the fluid bed roaster, ensures that, (1) any ferric iron, initially present in the concentrate or subsequently formed, is substantially reduced to ferrous iron; (2) a very low partial pressure of oxygen prevails which maintains the entire iron content of the partially desulfurized concentrate practically completely in its ferrous state; and (3) the formation of any sulfates is negligible. As noted above, in the calcine, at least about 90%, preferably at least about 95% and more preferably at least about 98% of the iron values are present in their ferrous state.

The partial desulfurization roast of the zinc concentrate may be carried out in the temperature range of about 900° to about 1100° C., preferably about 900° to about 1000° C., in the presence of an oxygen-containing gas, preferably air or oxygen-depleted air, for fluidizing and oxidation.

The partial desulfurization roasting of zinc sulfide concentrates is conveniently and best carried out in a fluidized bed reactor. However, there may be used any suitable type of roasting furnace or reactor wherein the sulfides may be oxidized to the oxides while sufficient residual sulfide is retained to maintain iron in the ferrous form.

On a microscale, the partial pressure of oxygen at any point in the fluid bed of zinc sulfide concentrate particles is maintained at a very low value by the presence of excess amounts of sulfide-sulfur.

To carry out the process effectively, reaction rates between components of the zinc concentrate and the oxygen need to be very fast and hence the temperature employed must be in the range indicated above to promote such fast reactions.

In our studies on zinc sulfide concentrates, the method employed in partial desulfurization roasting to maintain a regulated amount of sulfide-sulfur while producing practically no zinc ferrite content is that of using a continuous feed fluidized bed roaster and a very carefully regulated residence time of particulate concentrate in the roaster and temperature of the fluid bed of concentrate particles. Under commercial conditions, the partial desulfurization roasting may be effected also in a continuous fluidized-bed roaster wherein, at any set of fluidizing conditions, e.g. temperature in the bed and the fluidizing gas flow and composition, the steady state sulfide-sulfur content of the partially-desulfurized product may be maintained at any desired level simply by controlling the rate of concentrate delivery to the roaster and the comparable rate of removal of calcine from the roaster. By controlling the average residence time of the concentrate in the roaster, the product produced has a consistent and predesigned residual sulfide-sulfur content.

Alternatively, it is also possible to conduct the roasting step in conventional batch roasters, by decreasing the average in-bed residence time as required preferably to maintain at least about 8 wt % sulfide-sulfur but less than 14 wt % sulfide-sulfur in the bed. Since the last of the sulfide sulfur is always the most difficult to remove, especially when a continuous process is employed, the throughput of an existing roaster is significantly increased where the optimal product calcine is to be controlled at a residual value greater than 8% sulfide sulfur. To control the amount of calcine elutriated from a fluid bed roaster and thus residence time in the roaster, it may be desirable to agglomerate the feed to the roaster to achieve a 60 to 100 mesh cut. In this manner, a better control of the residence time of the concentrate-calcine in the roaster can be achieved, to result in overall better control of the operation.

The partial desulfurization process may be carried out under roaster conditions which result in a high strength $SO_2$-laden off-gas stream which has a very low oxygen concentration, generally less than about 0.5 volume % of oxygen, thereby also resulting in a very low level of $SO_3$. This off-gas stream is suitable for further processing and may be processed to achieve the economical production of sulphuric acid.

If desired, a portion, generally up to about 40%, of the roaster off-gas may be recycled to the roaster as a constituent of the fluidizing gas employed therein. As a result, a further lowering of the oxygen content of the roaster off-gas results, thereby achieving an even further decrease in the amount of $SO_3$ formed therein. In addition, such recycle produces a significant improvement in the activity, and therefore the leachability, of the calcine, when subjected to subsequent either acidic or basic dissolution, as well as an overall improvement in control of the partial roasting operation.

While the process of the invention is capable of avoiding almost completely the formation of zinc ferrite, some formation of zinc-iron complexes, (Zn-Fe)O, in which the iron is present in ferrous form, may occur during partial desulfurization roasting, depending on the degree to which sulfur is eliminated from the concentrate. These complexes have been found to be not as stable as the zinc ferrite spinels and, while not being soluble in ammoniacal ammonium carbonate medium or similar basic dissolution medium, the zinc content is readily dissolved in dilute acidic media, such as aqueous $SO_2$, and dilute sulfuric acid and HCl.

The partial oxidization process used herein on zinc concentrates effects selective oxidation of iron values to ferrous oxide, which rims the concentrate particles with dense, compacted, thin iron-rich outer layers, which may be shattered by thermal shocking, for example, by a rapid gas or liquid quench, to crack and break open the rims, thereby exposing a more active calcine. Alternatively, the partially-desulfurized particles may be lightly ball-milled to detach the magnetic iron-rich outer layer of the particles and thereby present a cleaner zinc oxide inner layer. Although the iron-rich outer layer contains substantial amounts of zinc, a subsequent flotation or magnetic separation operation may be carried out to effect separation between the magnetic iron oxide-enriched fraction and the zinc oxide.

The resultant partially-desulfurized concentrate produced exhibits a high reactivity and excellent amenability to leaching and may be acid or alkaline leached to recover the soluble zinc and iron oxide values preferentially over unreacted sulfides. Depending on the leachant employed, the zinc oxide and iron oxide values may be simultaneously removed from the calcine, while the residual zinc sulfide values remain in the solid phase, or the zinc oxide values may be selectively leached in preference to the iron oxide values, which then remain in the solid phase along with the residual zinc sulfide values, but is separated therefrom in a subsequent leaching step. In the following description, reference is made mainly to selective removal of zinc oxide values since this is the preferred mode of operation.

The partial desulfurization roasting process followed by a hydrometallurgical downstream leaching process allows oxide-sulfide mineral treatment to be easily combined, because most of the metal sulfides, and more particularly zinc sulfide, are not soluble in weak acid or alkaline solutions. As such, zinc sulfide portions retained in the leach residue of the partially desulfurized concentrate can be readily separated from residual iron oxide by chemical or physical methods, depending on the mineralogical structure of the leach residues, preferably for recycling to the roaster, so as to ensure very high overall recoveries of zinc. Separation of the zinc sulfide from the ferrous iron oxide values may be effected by a simple flotation or magnetic separation step. Preferably, however, the iron oxide is leached from the solids leach residue by a suitable lixiviant for the iron oxide in preference to the zinc sulfide, leaving the zinc sulfide values untouched. The second leach residue, containing most of the zinc sulfide values from the first leach residue and a much lower iron content, then may be returned to the roaster. The leachate may be processed to recover dissolved iron values therefrom in a variety of forms. With the recycle of the second leach residue to the roaster after removal of iron values therefrom, the overall zinc recovery from the initial zinc sulfide concentrate may exceed 97%, and can reach 99% under optimum conditions.

The use of aqueous ammoniacal-ammonium carbonate solution to effect initial preferential leaching of zinc oxide values from the partially-desulfurized roast has advantages in that the lixiviant is selective for the heavy metals as against the light metal, and is essentially easily regenerable, especially for calcines containing low amounts of soluble sulfates.

It should be noted that the use of aqueous ammoniacal ammonium carbonate as a leachant for zinc oxide values is not a new process, and is described in U.S. Pat. No. 4,071,357 to Peters, as applied to steel-making flue dust. The leaching process, however, is new in the context of the selective recovery of zinc oxide values in preference to ferrous iron oxide values and residual zinc sulfide values in a partially-desulfurized iron-bearing zinc sulfide roast.

The $NH_3/CO_2$ leaching process for partially desulfurized concentrate is based on the fact that free zinc oxide forms a soluble complex in aqueous solution containing a high concentration of ammonia and $CO_2$, and that this complex functions as an intermediate in the formation of a basic zinc carbonate ($2ZnCO_3 \cdot 3Zn(OH)_2$).

At such relatively high concentrations of ammonia and carbon dioxide, the solution is largely a mixture of ammonium carbonate, $(NH_4)_2CO_3$, in equilibrium with ammonium carbamate, $NH_2COONH_4$, and also containing a small amount of the normal ammonium bicarbonate $NH_4HCO_3$, depending on the solution pH. At the preferred ammonia and carbon dioxide concentrations, namely from about 6 to 18 moles of $NH_3$ per liter and about 1 to 3 moles of $CO_2$ per liter, the equilibrium is shifted from the carbonate to the carbamate structure. Upon contacting a partially oxidized concentrate with this leach system, the zinc values in the calcine rapidly complex with the ammonia and carbon dioxide to yield mainly a zinc ammonium carbamate. This complex, when broken down by loss of $NH_3$ and $CO_2$, results in precipitation of zinc as basic zinc carbonate, $2ZnCO_3 \cdot 3Zn(OH)_2$. The basic zinc carbonate may be further thermally decomposed to yield zinc oxide and carbon dioxide and water. From a reagent consumption view, for the above process cycle, 1 mole of $CO_2$ gas is consumed for every mole of zinc oxide solubilized. Of the total $CO_2$ regenerated, approximately 3/5 is recovered during hydrolysis and approximately 2/5 during the calcination. The ammonium ion is fully converted to ammonia gas during a hydrolysis step accompanied by steam stripping.

The net overall reaction of the entire process is:

$$NH_2COONH_4 \rightarrow 2NH_3 + CO_2$$

From a stoichiometric point of view, it is possible to operate the process with no chemical consumption, i.e. the $CO_2$ evolved during the hydrolysis and calcining steps can be combined with the ammonia liberated from the hydrolysis step to regenerate ammonium carbamate consumed in the leaching step. However, some make-up quantities usually are required.

Under ideal operating conditions, $NH_3/CO_2$ leaching solubilizes all of the valuable zinc oxide values in the partially-desulfurized concentrate, as well as the small quantities of other metal oxides which usually are present in variable quantities depending on their presence in the initial concentrate. The ferrous iron largely remains in the leach residue. $CO_2$ control (pH) is required during the leach to ensure that there is enough $CO_2$ to satisfy the conversion needs of the zinc, copper, cadmium, and similar metals, which may be present as oxides. Under such conditions it is possible to easily effect a selective separation with a high degree of efficiency of zinc from iron with minimum, if any, dissolution of iron. The co-leaching of iron has been found to be greatly dependent on the $CO_2$ content, time and temperature of the leach.

The solids loading during the leaching operation should be high enough to result in a high concentration of zinc in solution. It was found that a calcine loading of some 200 to 250 g/L effected some demarcation in selectivity of zinc over other metal impurities that constitutes one of the principal features of the $NH_3$—$CO_2$—$H_2O$ system.

Another important feature of the $NH_3/CO_2$ leaching of partially oxidized calcines is the extreme rapidity with which the zinc values are extracted. It is noted that a removal of some 90% of the total leachable zinc dissolved from a partially desulfurized calcine usually is achieved within approximately the first five minutes of leaching and generally is complete in approximately thirty minutes, so that increasing the leaching time beyond thirty minutes does not have a significant effect on the overall recovery of zinc.

By using the ammoniacal ammonium carbonate leach, it is possible to effect a highly efficient, selective separation between zinc and iron with little or substantially none of the iron being dissolved, even though the iron is present as ferrous oxide in the partially desulfurized concentrate. The ability to achieve this selective separation is important since iron usually is considered to be the most troublesome impurity during most zinc process operations. It is somewhat surprising that the ferrous iron oxide remains in the solid phase during leaching, since this material is normally a more reactive form of iron in alkaline medium. This is particularly so when the temperature is maintained above 30° C. and the pH above 11.

The solubility of iron encountered in leach liquors obtained from leaching partially-desulfurized concentrates is substantially lower than the solubilities of iron from a "dead" roasted calcine, wherein iron is present as ferric oxide. The overall low to zero solubilities of ferrous iron in $NH_3/CO_2$ solution may be attributable to the presence of minute amounts of sulfide-sulfur dissolved in the liquor, which acts as a ferrous iron dissolution inhibitor. Comparatively, the presence of sulfides was found to have only small influence, if any, on the dissolution of zinc.

The +2 state of oxidation of the iron in the partially desulfurized concentrate does not change during $NH_3/CO_2$ leaching, which makes the iron suitable for subsequent removal with aqueous $SO_2$ (or other dilute or weak acids) in which ferrous iron is known to be highly reactive. The absence of ferric iron in the leach residue also precludes any possibility of sulfate formation resulting from the reduction of ferric iron to ferrous by $SO_2$.

Residual sulfide-sulfur present in the residue dissolves extremely slowly during $NH_3/CO_2$ leaching conducted under mild leach conditions, in contrast to the zinc oxide values, and may be controlled by shortening the duration of the leach. A fractional hydrothermal precipitation of the basic zinc carbonate to separate, selectively and preferentially, the bulk of the zinc from any minute amounts of sulfur dissolved in the leach liquor, in the event dissolved sulfur is a
problem, also may be employed.

The $NH_3/CO_2$ leaching step on partially desulfurized concentrates, produces a residue containing zinc sulfides along with ferrous oxides and, in some instances, unleached zinc oxide as ferrous zincite. The zinc sulfide-bearing leach residues may be further treated by a selective lixiviant, such as $SO_2$, HCl, $H_2SO_4$ or $HNO_3$, to dissolve the ferrous iron and combined zinc oxide away from the zinc and other impurity metal sulfides. The residual zinc sulfide then may be recycled to the roaster to improve the overall yield of zinc.

Of the selective lixiviants for ferrous iron, $SO_2$ readily dissolves ferrous oxide to produce soluble ferrous bisulfite, $Fe(HSO_3)_2$. Dissolution times are measurable in minutes initially, but nearly complete removal of iron requires more than 4 hours at temperatures within the range of about 50° to 70° C. However, since the residual zinc sulfide is to be returned to the roaster, the iron content of this recycled product need not be any lower than the iron content of the original concentrate feed to the roaster. For example, if 60% of the zinc were leached from the partially desulfurized concentrate, only 60% of the iron need be removed from the resulting leach residue to maintain a consistent Zn/Fe feed to the roaster. This level of iron removal can be achieved in only 30 minutes using aqueous $SO_2$ solution under optimal leaching conditions.

The aqueous $SO_2$ solution also dissolves all the ferrous zincite complexes formed during roasting but not dissolved in aqueous $NH_3/CO_2$ solution with minimum, if any, dissolution of the zinc sulfides, yielding a zinc to sulfur ratio of 1.0 in the leach residue. Steam stripping of the resulting solution removes $SO_2$ and $H_2O$ from the bisulfite to precipitate ferrous monosulfite, $(FeSO_3)$. The purity of the resultant $FeSO_3$ depends on the extent to which ferrous zincite complexes, (Zn.Fe)O, are formed during the partial oxidation step. Ferrous sulfite can be decomposed at fairly low temperatures (less than 400° C.) to yield iron oxide and $SO_2$. The $SO_2$ recovered upon steam stripping and ferrous sulfite decomposition may be recycled. The calcination step may be followed by a rapid $NH_3/CO_2$ wash to selectively remove any entrained zinc and other base metal values from the iron oxide solids. The resulting iron oxide bearing residue may be of some value for direct reduction or oxidation processes.

Alternatively, dilute $H_2SO_4$ may be employed to dissolve the iron oxide and any ZnO tied up with the iron oxide without affecting the ZnS content of the residue. Neutralization of the liquor with ZnO to raise the pH to about 5 would cause precipitation of the iron (under oxidizing conditions) leaving a fairly pure $ZnSO_4$ solution.

Depending on the concentrate employed and the degree of sulfur elimination established, between about 50 to 70 percent of the zinc in the partially oxidized calcine is readily dissolved in the $NH_3/CO_2$ medium. Selective removal of iron from the $NH_3/CO_2$ leach residue ensures almost complete recovery of the zinc sulfide contained in the residue. If the iron removal step by aqueous $SO_2$ is about 95% efficient, accounting for some bleed-offs to prevent build-up of heavy metals in the circuit, overall zinc yields between about 97.5 to 98.5% are obtainable.

The zinc values present in the ammoniacal ammonium carbonate leach liquor from the initial leach of the partially-desulfurized roast, may be recovered in a variety of ways. One preferred procedure involves zinc dust cementing the leach filtrate to replace impurities, such as copper, lead, cadmium and cobalt, with zinc dust, steam stripping the purified leach liquor of ammonia and carbon dioxide to substantially quantitatively precipitate zinc, as basic zinc carbonate, and then steam calcining the basic zinc carbonate, typically at a temperature of about 250° to 300° C., to break it down to zinc oxide and carbon dioxide.

This preferred route has the advantages that it can be carried out in closed vessels at atmospheric pressure, that the zinc values can be recovered as relatively pure basic zinc carbonate by the steam stripping operations preceded by zinc dust cementation, that the $NH_3$ and $CO_2$ can be regenerated and recycled to treat subsequent calcine charges and that the resultant basic zinc carbonate can easily be thermally decomposed to produce a premium, high surface area zinc oxide for which good market potential exists.

Variations exist for the above-described processing operation. For example, depleted recycle electrolyte may be used to dissolve pure basic zinc carbonate to produce the desired pregnant electrolyte for electrowinning of the zinc values. Alternatively, the pure basic zinc carbonate may be subjected to a mild calcination to remove its $CO_2$ content to give a pure zinc oxide product which then may be readily dissolved in the depleted recycle electrolyte. Either of these approaches bypasses the conventional zinc dust cementation process which is conducted under acidic conditions and considered rather costly.

The production of a partially-desulfurized roast which then is subjected to hydrometallurgical processing permits a high degree of flexibility in utilizing different raw materials to produce various grades of zinc oxide. The reagents used in the described processes, e.g. zinc dust, $SO_2$, $NH_3$, $CO_2$, $H_2SO_4$, are among the least expensive chemicals used in any processing plant and these can be recovered, either as marketable by-products or may be regenerated and recycled for re-use, which substantially reduce operating costs. The process can be engineered as a nearly closed-loop system with minimum environmental impact and can be operated under a controlled atmosphere in a semi-continuous or continuous mode. By conducting the primary leaching steps in basic media, a non-corrosive environment is present which does not require special materials of construction.

Another advantage of the process of the present invention, is that the partial desulfurization roasting operation may be readily integrated into existing metal plants, particularly electrolytic zinc plants, without a major capital expenditure. This may readily be done by employing greater throughputs through existing roasters to regulate the residence time required to effect a specific degree of sulfur elimination and further processing the resultant partially-desulfurized concentrate in dilute sulfuric acid wherein the unreacted zinc sulfide, which is acid insoluble at atmospheric conditions, can be recycled to the roaster for re-use, thus making possible the recovery of substantial higher percentage of zinc than can be achieved by current practices and yet at lower cost.

Under the conditions of partial desulfurization roasting, the degree to which each metal sulfide in the concentrate is oxidized to its respective oxide depends upon its relative stability in comparison with that of other metal sulfides present under the prevailing oxidizing conditions. For example, both cadmium sulfide and copper sulfide are more stable than zinc sulfide and hence the degree of their conversion to their respective oxides is less than that of the zinc sulfide and s different from each other. For the most part, these materials remain inert during further processing of the partially-desulfurized zinc sulfide concentrate.

By maintaining sufficient amounts of sulfide-sulfur present at all times during the partial desulfurization roasting step to maintain at least about 90%, preferably at least about 95% of the iron in its ferrous state, the formation of zinc ferrite is prevented. Zinc ferrite spinels, as opposed to ferrous zincite complexes, are not very soluble in dilute acid media under mild leach conditions and, therefore, complete liberation of zinc values from the calcine previously could not be obtained unless a stronger acid was used, such as hot, more concentrated $H_2SO_4$. The problem with such a hot strong $H_2SO_4$ process is that the associated iron values are also co-dissolved and must subsequently be removed and disposed of using costly techniques. Another problem associated with zinc ferrites, but not shared with ferrous zincites, is the co-formation of sulfates owing to the reduction of ferric iron to ferrous by acid lixiviants such as aqueous $SO_2$. The presence of sulfates in a sulfite system further complicates the separation of zinc from iron, making the recovery of zinc very cost intensive. These prior art problems of handling and post processing the zinc ferrite formed in zinc sulfide concentrate roasting are eliminated to a significant degree by the invention.

DESCRIPTION OF PREFERRED EMBODIMENT

Figure 1:
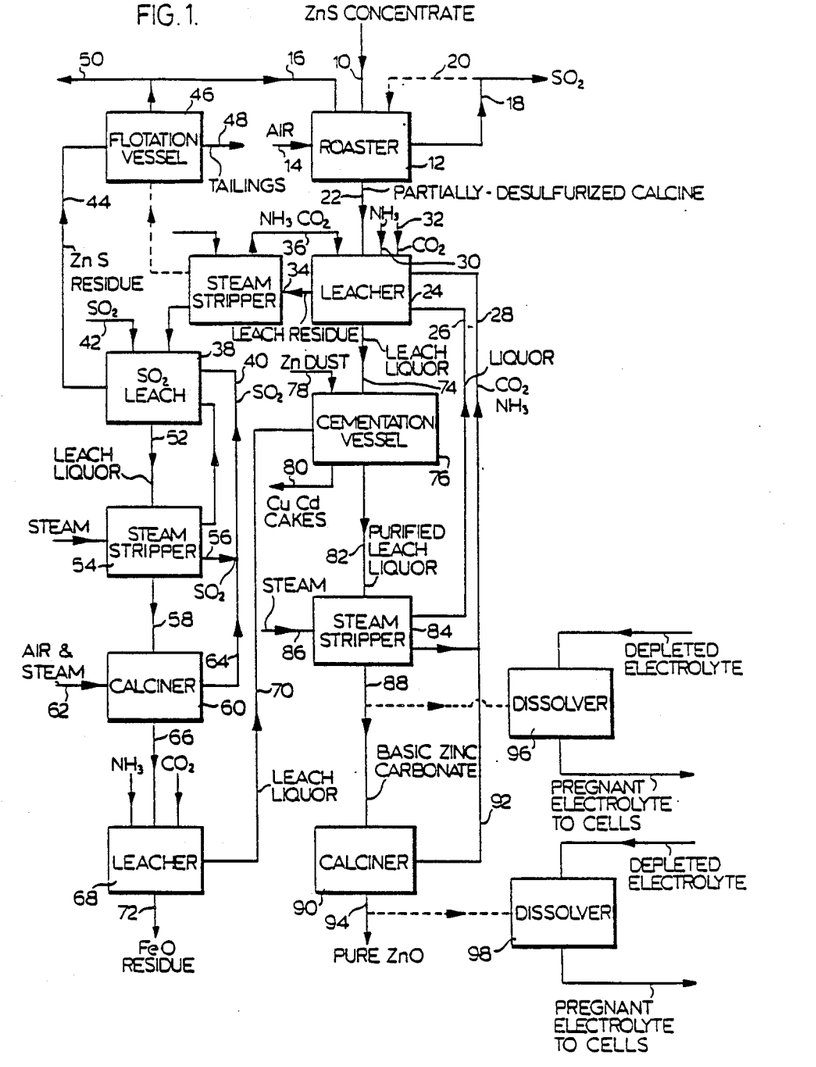
FIG. 1 is a schematic flow sheet of an embodiment of the invention for the processing of an iron-bearing zinc sulfide concentrate to recover zinc and iron values in various forms.

Referring to FIG. 1, a zinc concentrate feed is fed by line 10 to a suitable roaster 12 wherein the zinc concentrate is calcined in air fed by line 14, along with recycled material in line 16. Sulphur dioxide laden off-gas ($SO_2$ concentration about 17 to 20%) substantially free of oxygen ($O_2$ concentration less than about 0.2%) is vented via line 18 for the purpose of making sulfuric acid or liquid $SO_2$. Optionally, a portion of the roaster off-gases can be recycled back to the roaster by line 20 for the production of more active calcine in alkali or acid media.

The partially-desulfurized concentrate resulting from the roasting operation, having the iron substantially (at least about 90%, preferably at least about 95%) in its ferrous state is passed from the roaster 12 by line 22 to a leacher 24 wherein the partially desulfurized concentrate is leached with an aqueous ammoniacal ammonium carbonate solution provided by recycle liquor and regenerated ammonia and carbon dioxide recycle gases fed by lines 26 and 28 respectively and $NH_3$ and $CO_2$ make-up gases fed by lines 30 and 32 respectively. In the $NH_3/CO_2$ leacher 24, the free zinc oxide values present in the calcine are preferentially dissolved over other metal values, particularly iron oxide and unreacted zinc sulfide.

The resulting leach residue is separated from the pregnant leach liquor and is passed by line 34 to an optional steam stripping step to remove and recover any chemisorbed ammonia and carbon dioxide gases, which are recycled by line 36 to the primary $NH_3/CO_2$ leacher 24. The leach residue may alternatively pass directly to the iron removal step.

In the iron removal step, the leach residue is further treated in a second leacher 38 with aqueous sulfur dioxide in recycle line 40 along with make-up $SO_2$ in line 42 to selectively dissolve the ferrous iron from said residue as ferrous bisulfite, leaving the zinc sulfide and minor base metal sulfides for recycling to the roaster 12. In order to avoid the build-up of the impurity base metal sulfides (e.g. typically Ag, Ca, Cd) in the circuit, the recycle zinc sulfide stream in line 44 either can be treated in a flotation vessel 46 to recover separately the more easily floated sulfides in line 48, prior to forwarding the undigested zinc sulfide to the roaster 12 by line 16, or alternatively, a small portion of the recycle stream can be bled-off by line 50 to keep the level of the impurity base metals in balance in the process circuit.

The ferrous bisulfite leach solution, probably containing minor amounts of other metal bisulfite, in particular some zinc bisulfite, is forwarded by line 52 to a steam stripper 54 wherein the filtrate is steam stripped to remove $SO_2$ and to precipitate iron and other sulfites. The stripped $SO_2$ is recycled by line 56 to the $SO_2$ leach for reuse therein. The resultant ferrous sulfite solids are forwarded by line 58 to a calciner 60 wherein the ferrous sulfite and other entrained metal sulfites, namely zinc sulfite, are treated with steam fed by line 62 at temperature of, say about 500° C. to form ferrous/ferric oxides and other impurity metal oxides, particularly zinc oxide. The resultant sulfur dioxide in line 64 is recycled to the $SO_2$ leach.

Prior to the disposal of the resultant ferrous/ferric oxide to a tailing pond, in order to effect higher recoveries of zinc, this calcine may be forwarded by line 66 to a leacher 68 to recover zinc oxide which did not dissolve during the primary $NH_3/CO_2$ leaching step but co-dissolved subsequently with the iron during the $SO_2$ leach step by a further $NH_3/CO_2$ leach. The separated zinc leach liquor in line 70 may be given a polishing purification in the main zinc cementation step ahead of steam stripping, otherwise this solution may be forwarded directly to the $NH_3/CO_2$ steam stripping step, described below. The iron oxide produced is discharged from the leacher 68 by line 72 and may be disposed of, for example, by marketing to the steel industry or by use as old mine backfill.

Alternatively, the ferrous sulfite solids can be treated directly with an $NH_3/CO_2$ or $NH_3$ leach solution for dissolution of the zinc at that point rather than after the calcining step.

The impure leach liquor filtrate from the primary $NH_3/CO_2$ leacher 24 is forwarded by line 74 to a cementation vessel 76 for contact therein with zinc dust fed by line 78. The cementation step removes metal impurities such as copper, cadmium, lead and cobalt. An enriched copper-cadmium-zinc cake is discharged from the cementation vessel 76 by line 80 and can be marketed or be further treated for recovery of its valuable metals content. Cementation conducted in a basic solution is found to be much faster, more cost effective, and requiring much less consumption of zinc dust than when conducted in an acidic solution. Usually, only a single stage of cementation is required for effective removal of impurities.

The cementation filtrate, high in soluble zinc content, then is forwarded by line 82 to a steam stripper 84 wherein the filtrate is steam stripped by steam fed by line 86 to remove ammonia and carbon dioxide and to precipitate a basic zinc carbonate. The stripped ammonia and carbon dioxide gases are recycled by line 28 to the primary $NH_3/CO_2$ leacher 24 for re-use therein. The liquor recovered from the basic zinc carbonate also is recycled by line 26 to the primary $NH_3/CO_2$ leach step.

The basic zinc carbonate precipitate is separated and forwarded by line 88 to a calciner 90 wherein the basic zinc carbonate is subjected to a mild calcination to break it down to zinc oxide and carbon dioxide. The carbon dioxide also is recycled by lines 92 and 28 to the primary $NH_3/CO_2$ leacher 24 and the pure zinc oxide is recovered by line 94. The zinc oxide product may be sold, as such, or may be further processed to produce zinc metal.

The basic zinc carbonate in line 88 and/or the zinc oxide in line 94 may be used to replenish depleted electrolyte from the electrowinning of zinc metal by forwarding, respectively, to a dissolver 96 or 98. The pregnant electrolyte which then results may be forwarded to the electrowinning cells.

In the process described above with respect to FIG. 1, the zinc sulfide concentrate is processed to recover substantially pure zinc oxide and basic zinc carbonate, by procedures which do not involve complicated processing such as is associated with zinc ferrite formation.

EXAMPLES

Example 1

An extensive experimental study has been conducted into the desulfurization of a zinc sulfide concentrate, namely a zinc sulfide concentrate supplied by Kidd Creek Mines, Ontario, Canada (identified as "KCCA"). This material assayed as set forth in the following Table I:

TABLE I

| | |
|---|---|
| Zn | 51.6%* |
| Fe | 9.14% |
| Cu | 0.868% |
| Cd | 0.288% |
| Ca | 0.095% |
| Mg | 0.070% |
| Co | 0.017% |
| As | 0.029% |
| Pb | 0.552% |
| S | 31.7% |

*All percentages in this Table and throughout this specification are on a weight basis, unless otherwise specified.

Desulfurization was effected at a temperature of about 920° C. in air in a continuous fluidized bed roaster to which particulated concentrate of particle size −60° mesh was continuously fed and from which roasted concentrate was removed continuously after a predetermined residence time. The results obtained in the study are depicted graphically in FIG. 2. Examining the relationship between the percent sulfur of original sulfur and the residence time, as well as the relationship between percent ferrous iron to the total iron and the residence time, reveals from the data presented in FIG. 2 that the portion of the iron which is likely initially present in the concentrate as ferric was readily reduced to ferrous in the presence of the excess residual sulfide-sulfur which resulted from roasting for short residence times. In addition, the entire iron remained substantially as ferrous (around 98% FeII), independent of the residence time or the degree of sulfur elimination, as long as the residence time did not exceed about 1.5 hours, or as long as the percent sulfur of original sulfur in calcine was not less than 20% (approx. 6 to 7% residual S). When longer residence times than 1.5 hours were employed, sulfur was eliminated to a degree where it was no longer capable of providing the needed reducing effect to maintain the iron entirely as ferrous, and ferrous iron was quickly oxidized to the ferric state.

Figure 2:
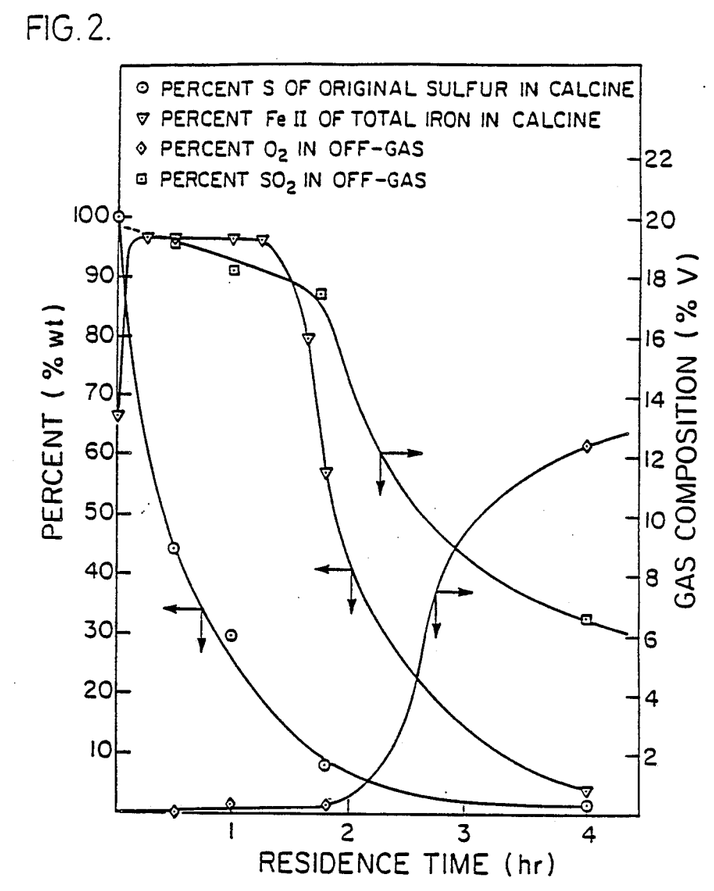
FIG. 2 is a graphical representation of the effect of reactor residence time on residual sulfur, percent ferrous iron in the calcine and off-gas composition under a particular set of roasting conditions.

Up to a residence time of about 2 hours the $SO_2$ concentration in the off-gas varied slightly from 20% to 17% over the residence time range of 0.5 to 2 hours, progressively then falling off with longer residence time reaching a concentration of only 6% at a residence time of 4 hours. While the $SO_2$ concentration in the off gas dropped slightly over the residence time interval of 0.5 to 2 hours, the oxygen concentration in the off gas shows a complete independence of the residence time over the same interval and remained practically nil at less than 0.25% of $O_2$. At longer residence times than 2 hours, corresponding to a degree of sulfur elimination in excess of 90% and the commencement of ferric iron formation, the concentration of oxygen showed a dramatic increase, reaching some 12% of $O_2$ at residence time of 4 hours. Low oxygen levels in the roaster off gas were achieved only when the residence time for partial oxidation roasting was of short duration, such as less than 2 hours.

From these results, it may be concluded that, if substantially complete avoidance of ferric oxide formation, thus ferrite formation, is to be achieved in a partial desulfurization roast of a zinc sulfide concentrate, the residence time of the solid concentrate in the fluidized-bed roaster should be controlled between some 0.5 to some 1.25 hours to a degree of eliminating some 30% but no more than 85% of the sulfur content of the original concentrate. This limited degree of sulfur elimination not only ensures the presence of substantially the entire amount of iron as ferrous to preclude any possibility of any significant degree of zinc ferrite formation but also results in an off-gas high in $SO_2$ concentration and extremely low in oxygen concentration and thereby substantially free of $SO_3$ gas. The results obtained indicate that such relatively short residence times, needed to ensure a constant product with respect to its sulfide-sulfur content, at any desired level, can simply be achieved and controlled via the use of a conventional fluid bed reactor or a cycling, fast moving bed reactor.

Example 2

A further extensive experimental study has been carried out using partially-desulfurized KCCA produced in the study described in Example I to investigate the influence of the degree of sulfur elimination, i.e. percent residual sulfur in the calcine, on variables, such as zinc-to-sulfur molar ratio in leach residue and overall free zinc oxide recovery by leaching the partially desulfurized concentrates in an aqueous $NH_3/CO_2$ medium. The leaching of the partially-desulfurized concentrate was effected at about 40° C. for about 30 mins using aqueous ammoniacal ammonium carbonate having a pH 11.5 at a solids loading of about 80 g/l. The results obtained are illustrated graphically in FIG. 3.

Figure 3:
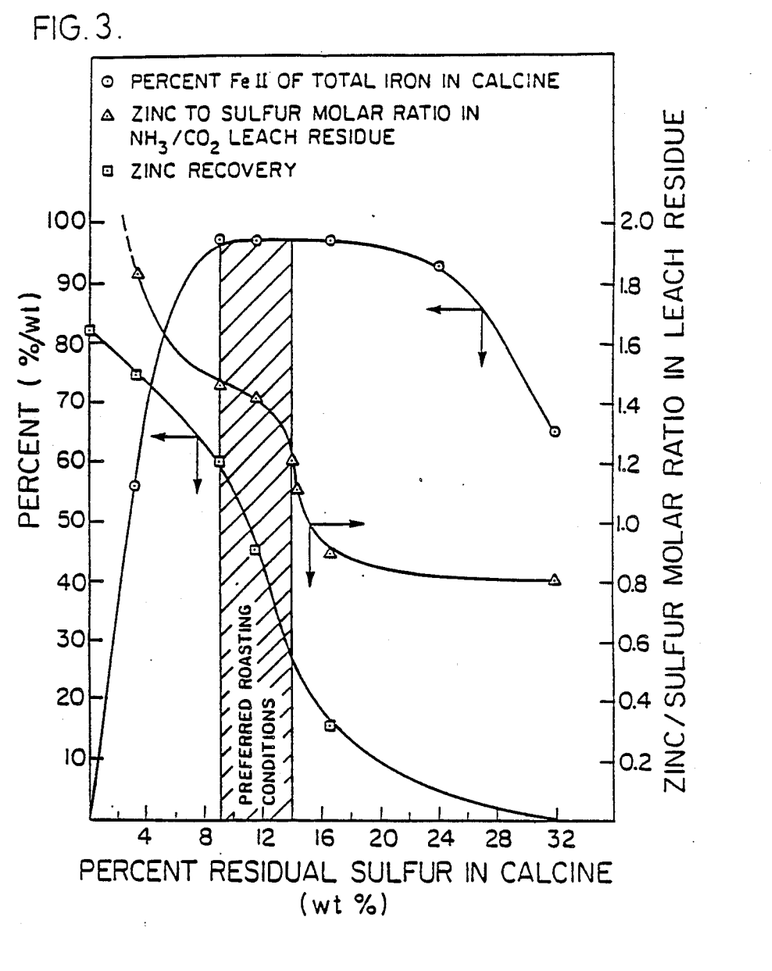
FIG. 3 is a graphical representation of the effect of residual sulfur in the calcine on ferrous iron content, zinc recovery and zinc to sulfur molar ratio in the leach residue after ammoniacal ammonium carbonate leaching of the calcine for a particular zinc sulfide concentrate.

The data shown in FIG. 3 shows that the Zn/S molar ratio in the leach residue was dependent on the sulfide-sulfur content in the calcine. Up to a degree of sulfur elimination desulfurization of some 60% (i.e. 16.5% wt residual sulfur), the Zn/S ratio was only slightly dependent on the residual sulfur remaining in the calcine, with the Zn/S ratios varying from 0.8 to 0.9. Over this range of the partial desulfurization spectrum, the zinc sulfide and other metal impurity sulfides were likely progressively oxidized to their respective free oxides without forming insoluble complexes. Of importance in this range is the fact that ferric iron, (initially present in the concentrate as ferric iron), was gradually reduced to ferrous iron, reaching nearly complete reduction when the residual sulfur in the calcine dropped to some 20 wt % S (corresponding to a degree of sulfur elimination of 45%). To effect such a degree of sulfur elimination, it can be seen from FIG. 2 that a residence time longer than 25 min. was required to completely reduce the ferric iron to ferrous iron and to maintain the entire iron content of the calcine (approximately 98%) in the ferrous state. The maximum zinc recovery from the starting concentrate achievable in this range of the partial oxidation spectrum was fairly low, at only about 15% zinc, when using the aqueous $NH_3/CO_2$ as the leaching medium.

The results of FIG. 3 further show that, at a higher degree of sulfur elimination, corresponding to a residual sulfur less than 17 wt % S, the Zn/S ratio in the leach residue exhibits a strong dependence on the degree of sulfur elimination, rapidly increasing from 0.9 at residual sulfur of some 17 wt % S, to a ratio of 1.5 at residual sulfur of 9 wt % S. Over this range, the entire iron was maintained practically as ferrous iron. The higher Zn/S ratio obtained over this range of the partial desulfurization spectrum is indicative of incomplete recovery of the oxidized zinc sulfide (ZnO) values from the calcine.

The insolubility of a portion of the oxidized zinc sulfide in the aqueous $NH_3/CO_2$ leach medium is attributable to the formation of $NH_3/CO_2$-insoluble ferrous zincite complexes (Zn.Fe)O. However, these complexes, while being insoluble in the $NH_3/CO_2$ medium, are rather soluble in dilute acidic media. Complete avoidance of the formation of these complexes may be achieved at a lower degree of sulfur elimination (some 0%), but such a lower degree of sulfur diminution results in a fairly low zinc recovery of only some 15% to 20% Zn, as indicated by FIG. 3. The relatively high solubility of the ferrous zincite complexes in acidic media indicates the desirability of operation of the roaster in this range of the partial desulfurization spectrum.

Further, the results of the leaching experiments depicted in FIG. 3 demonstrate that the overall zinc recovery was nearly linearly proportional to the degree of sulfur elimination over the above partial oxidation range, varying from some 15% zinc recovery from a calcine with residual sulfur of about 16 wt % to some 60% zinc recovery from a calcine with residual sulfur of about 9 wt % (degree of sulfur elimination 77%).

At a higher degree of sulfur elimination than 77% (corresponding to a residual sulfur less than 9 wt % S), a noticeable oxidation of ferrous iron to ferric began and progressively proceeded nearly to completion with decreasing sulfide-sulfur content in the calcine to a level less than 0.5 wt % S. As shown in FIG. 3, the presence of ferric iron in the calcine had a pronounced effect on the Zn/S ratio in the leach residue. Over the range where oxidation of ferrous iron to ferric takes place, the Zn/S ratio was very strongly dependent on the degree of sulfur elimination, increasing exponentially to a Zn/S ratio of 1.9 when the employed calcine contained some 3.2 wt % S (degree of sulfur elimination of 92%). The Zn/S ratio of 1.9 indicates that, at this level of sulfur elimination, for each mole of zinc sulfide present in the residue there is also 0.9 mole of zinc oxide which is insoluble in $NH_3/CO_2$ medium. The high zinc to sulfur ratios obtained over this range of the partial oxidation spectrum, are attributable to a shift in composition from ferrous zincite complexes (Zn.Fe)O to zinc ferrite ($ZnFe_2O_4$). The flatter segment of the zinc recovery curve for residual sulfur lower than 9 wt % S is also indicative of concomitant zinc ferrite formation. As may be seen, the maximum zinc recovery from a 'dead' roasted Kidd Creek calcine A was only 83%. This low recovery of zinc is attributed to the presence of acid insoluble zinc ferrites.

As the results of FIG. 3 show, the only way to achieve a complete avoidance of iron spinel (zinc ferrite) formation was to control the roasting conditions in a way to adjust the sulfide-sulfur level in the calcine bed, at a level not lower than, say, 9% wt S for the KCCA feed concentrate tested, thus producing a calcine with essentially all the contained iron as ferrous (approximately 98% in these experiments). The formation of ferrous zincite complexes is not a major problem as these complexes are not as stable as the zinc ferrites and can be easily decomposed in dilute acidic media.

As seen from the data presented in FIGS. 2 and 3, the most important factor to achieve success when partially roasting zinc concentrates is the residence time and its relation to the degree of sulfur elimination. The experiments reported in FIG. 3 have shown that the zinc-to-sulfur ratio in the $NH_3/CO_2$ leach residue increased substantially only when the degree of sulfur elimination was higher than 56%. At this degree of sulfur elimination, only about 15% recovery of zinc was achievable, without any recycle of residual zinc sulfide. From a practical point of view, satisfactory zinc recovery results were not obtainable until a degree of sulfur elimination of some 77% was achieved, resulting in some 60% zinc recovery. Although a continued increase in the degree of sulfur elimination gave still better zinc recoveries, the high propensity of ferrous iron to be oxidized to ferric, thus forming the acid/alkaline insoluble zinc ferrites above those levels, limits the ability to further increase the degree of sulfur elimination. To render the partial roast-$NH_3$/$CO_2$ leach process successful, the preferred range of residual sulfur to be retained in the KCCA calcine was determined be 8 to 14 wt % S.

Example 3

Figure 4A:
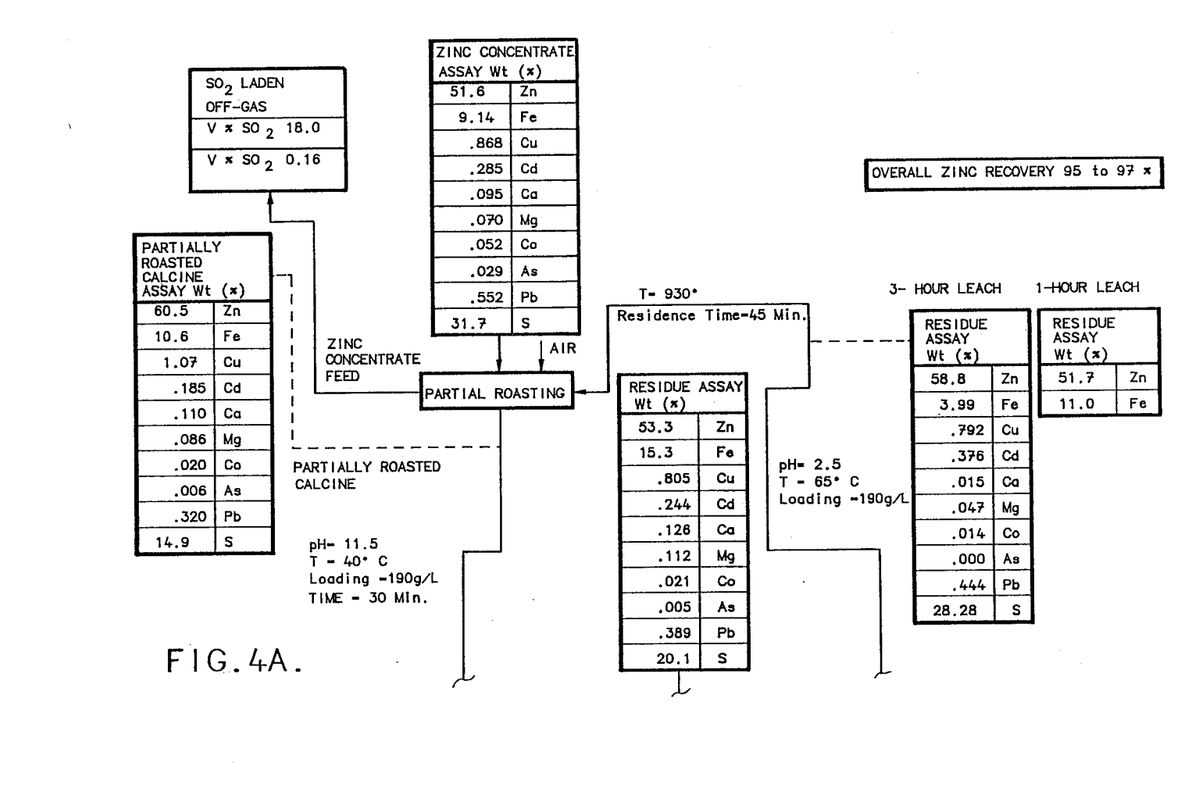
Figure 4B:
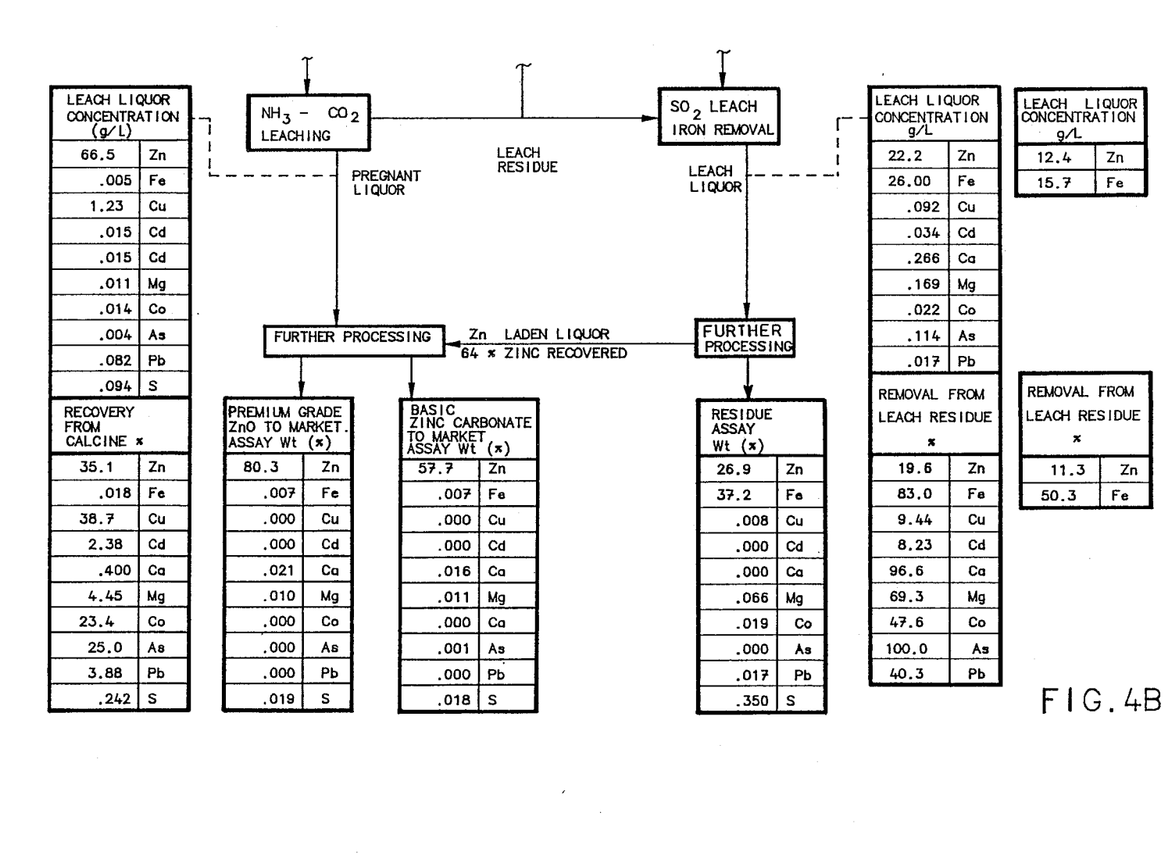
Figure 5A:
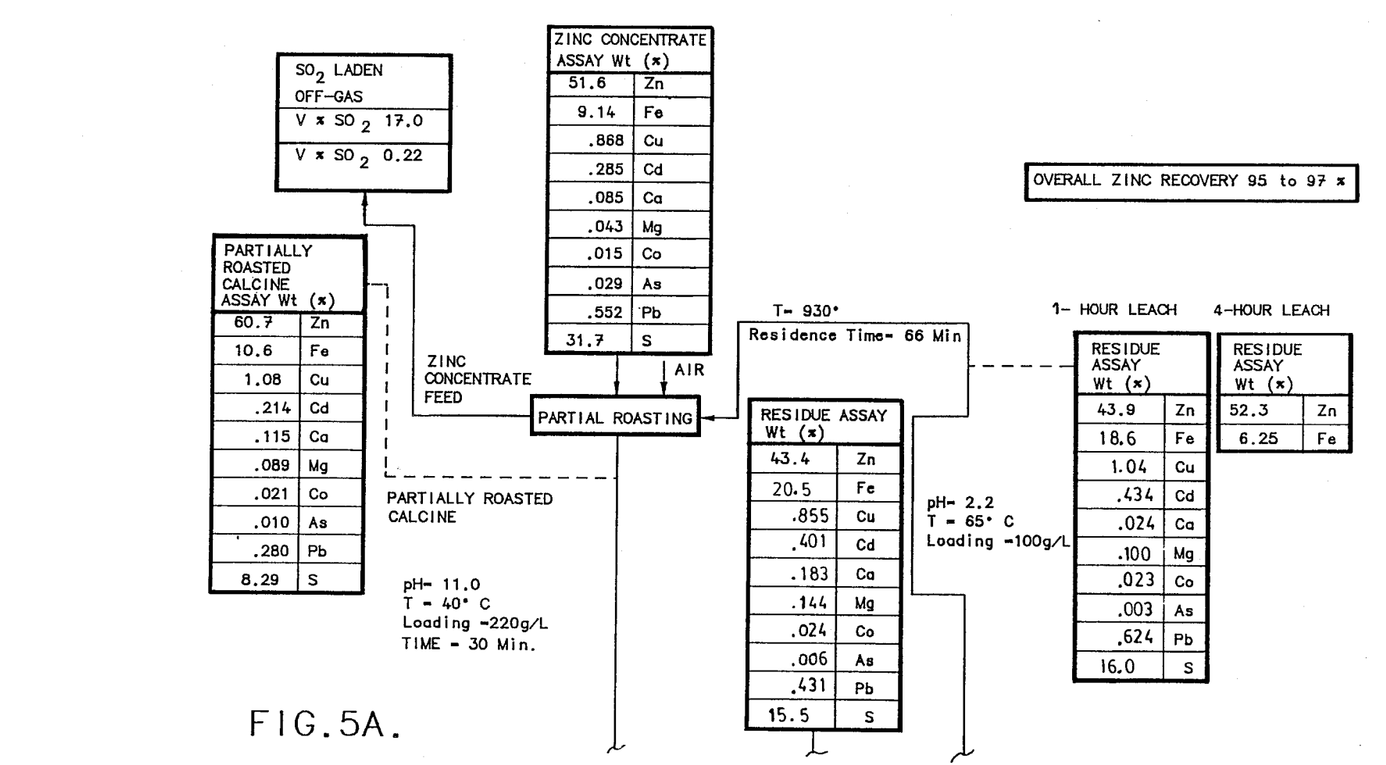
Figure 5B:
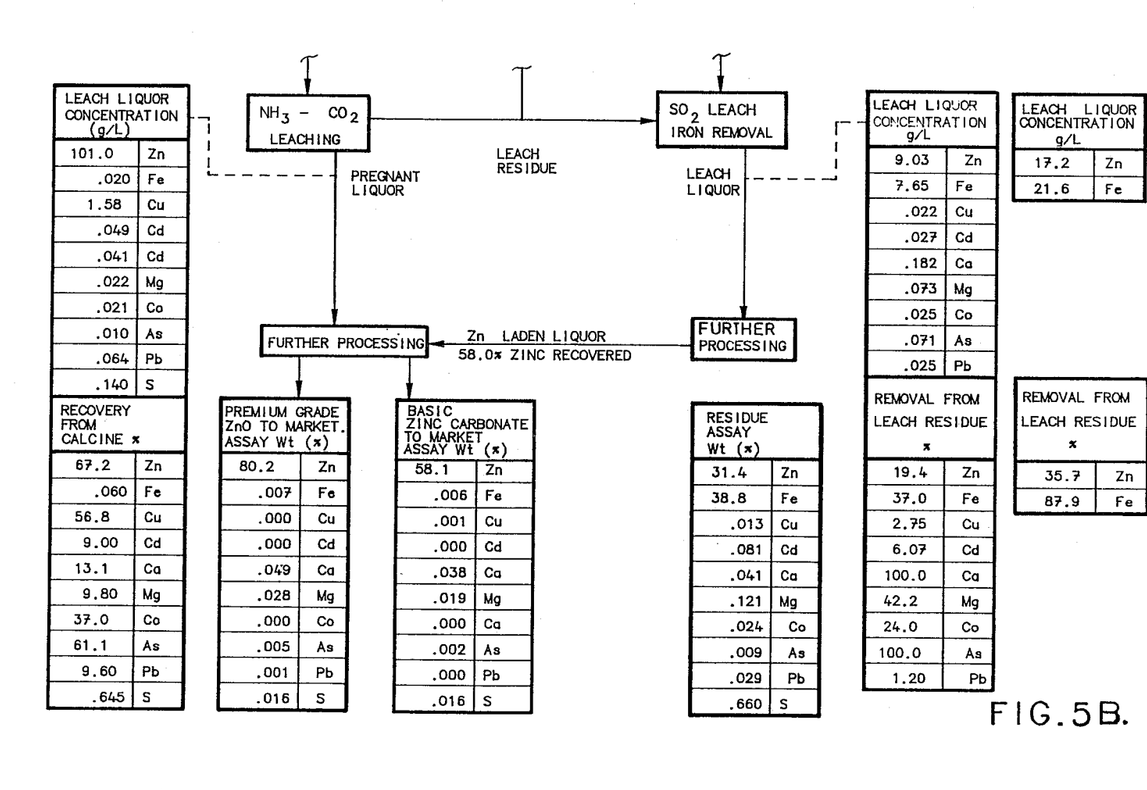

Based on the experimental studies described in Examples 1 and 2 and the graphical representation of this data in FIGS. 2 and 3, mass balances were calculated for the process of partial desulfurization roasting, followed by aqueous ammoniacal ammonium carbonate leaching to selectively dissolve zinc oxide values, further selective leaching to dissolve ferrous iron oxide values using sulphur dioxide leaching, and recycle of residual zinc sulfide to the roaster, for two forms of partially-roasted zinc concentrate, namely one having a residual sulfide-sulfur content of 14.9 wt. % and the other having a residual sulfide-sulfur content of 8.29 wt. %. The mass balances for the two partial roast-$NH_3$/$CO_2$ leach processes are depicted in FIGS. 4 and 5 respectively.

SUMMARY OF DISCLOSURE

In summary of this disclosure, the present invention provides an improved process for the recovery of zinc values, from iron-containing zinc sulfide materials, particularly concentrates, by effecting only a partial desulfurization to an extent such that substantially all the iron values remain in ferrous form, thereby preventing the formation of sulfates and zinc ferrites, followed by selective removal of zinc and ferrous iron values in oxide form from the roast while leaving the unoxidized zinc sulfides in the solid phase for convenient recycle to the roaster. Modifications are possible within the scope of this invention.

What we claim is:

1. A process of treating iron-bearing zinc sulfide material, which comprises:
   contacting said zinc sulfide material with an oxidizing gas containing molecular oxygen at a temperature of at least about 900° C. and below the sintering temperature of said material to effect desulfurization and to convert zinc and iron values contained in said material to oxide form while retaining residual sulfide-sulfur throughout said contacting step and in a partially-desulfurized product resulting therefrom in an amount such that at least about 90% of the iron values are present in the product in the form of ferrous oxide,
   subsequently recovering the zinc and iron values in oxide form from said partially-desulfurized product while retaining zinc values in sulfide form in said product, and
   returning, following said removal of said zinc and iron values in oxide form, the retaining zinc sulfide values to said contacting step.

2. The process of claim 1 wherein said contacting step is effected at a temperature of about 900° to about 1000° C.

3. The process of claim 1 wherein said contacting step is effected in a fluidized bed of particles of said material in contact with said oxidizing gas as the fluidizing medium.

4. The process of claim 3 wherein said fluidized bed is operated on a continuous basis by feeding particulated material continuously to said bed of particles and removing continuously particles of partially-desulfurized product from said bed of particles at a rate regulated to effect said degree of desulfurization to particles removed from said bed of particles.

5. The process of claim 4 wherein residence time is about 0.5 to about 1.25 hours.

6. The process of claim 1 wherein the degree of desulfurization from the zinc sulfide material is from about 30% to about 85% of the initial sulfur content of said zinc sulfide material.

7. The process of claim 1 wherein the degree of desulfurization results in a residual sulfide-sulfur content of the partially-desulfurized product of about 5 to about 22 wt. %.

8. The process of claim 7, wherein the residual sulfide-sulfur content of the partially-desulfurized product is about 8 to about 14 wt. %.

9. The process of claim 1 wherein sulfide-sulfur is present in said partially-desulfurized product in sufficient amount to react with any metal sulfate initially present with said zinc sulfide material or formed during said contacting step to form sulfur dioxide and metal oxide.

10. The process of claim 1 wherein sulfide-sulfur is present in said partially-desulfurized product in sufficient amount to reduce any ferric iron oxide initially present with said zinc sulfide material or formed during said contacting step to ferrous iron oxide.

11. The process of claim 1 wherein said partially-desulfurized material is subjected to a fluid quench step after formation thereof and prior to said removal step.

12. The process of claim 4 wherein said contacting step concomitantly produces an $SO_2$-laden off-gas stream containing less than about 0.5% of oxygen gas.

13. The process of claim 13 wherein up to about 40% of said off-gas stream is recycled to the fluidized-bed contacting step.

14. The process of claim 1 wherein said oxidizing gas is air.

15. The process of claim 1 wherein said zinc and iron values in oxide form are removed sequentially from the partially-desulfurized product by leaching the product (a) with a selective leachant for zinc oxide values in preference to iron oxide and zinc sulfide values to remove said zinc oxide values from said partially-desulfurized product and (b) with a selective leachant for ferrous iron oxide values in preference to zinc sulfide values to remove said iron oxide values from said partially-desulfurized product.

16. The process of claim 15 wherein said selective leachant for zinc oxide values is aqueous ammoniacal ammonium carbonate solution and said contact of said partially-desulfurized product with said ammoniacal ammonium carbonate solution forms a leach slurry containing a leach residue containing said iron oxide and zinc sulfide values.

17. The process of claim 16 wherein said ammoniacal ammonium carbonate contains about 6 to about 18 moles/liter of $NH_3$ and about 1 to about 3 moles/liter of $CO_2$.

18. The process of claim 16 wherein said leaching of said partially-desulfurized product with said ammoniacal ammonium carbonate solution is effected by contact of said partially-desulfurized product with said ammoniacal-ammonium carbonate solution for at least about 5 minutes at a temperature of about 30° to about 60° C.

19. The process of claim 17 wherein said leaching with ammoniacal ammonium carbonate is effected by said contact for about 10 minutes to about 2 hours.

20. The process of claim 17 wherein said leaching with ammoniacal ammonium carbonate is effected by said contact for about 10 to about 30 minutes.

21. The process of claim 16 wherein said leach slurry is aerated at a temperature of about 30° to about 60° C. to precipitate any hydrous ferric oxide present therein.

22. The process of claim 16 wherein said leach residue is steam stripped to recover therefrom any $CO_2$ and $NH_3$ contained therein.

23. The process of claim 15 wherein said selective leachant for ferrous iron oxide values is dilute sulfurous acid or dilute sulfuric acid.

24. The process of claim 23 wherein said leaching of ferrous iron oxide values from said partially-desulfurized product is effected using dilute sulfurous acid at a temperature of about 50° to about 80° C. under an $SO_2$ atmosphere.

25. The process of claim 16 wherein said leach residue is contacted with aqueous $SO_2$ to dissolve therefrom residual zinc oxide values not dissolved by the ammoniacal ammonium carbonate as well as said iron oxide values and to form an iron-rich bisulfite solution.

26. The process of claim 16 wherein leach liquid resulting from said selective leaching of zinc oxide values from said partially-desulfurized product, following separation from said leach residue, is contacted with zinc dust to precipitate metal impurities in said leach liquor which are electronegative to zinc, the precipitated impurities are removed, the purified leach liquor is steam stripped to remove ammonia and carbon dioxide and to precipitate quantitatively zinc values in said purified leach liquor as basic zinc carbonate, and the precipitated basic zinc carbonate is separated.

27. The process of claim 26 wherein said separated basic zinc carbonate is calcined to form zinc oxide and carbon dioxide.

28. The process of claim 27 wherein the ammonia and carbon dioxide removed in the steam stripping of purified leach liquor and the carbon dioxide from the calcining of basic zinc carbonate are recycled to the ammoniacal ammonium carbonate leaching step.

29. The process of claim 26 wherein said separated basic zinc carbonate is dissolved in spent electrolyte from a conventional zinc metal electrowinning process to form a fresh pregnant electrolyte for such electrowinning process.

30. The process of claim 26 wherein said basic zinc carbonate is calcined at a temperature less than about 350° C. to produce a zinc oxide substantially free from metal impurities and having a surface area from about 30 to about 120 m$^2$/g.

31. The process of claim 30 wherein said calcination is effected under vacuum.

32. The process of claim 27 wherein the zinc oxide resulting from said calcining step is dissolved in spent electrolyte from a conventional zinc metal electrowinning process to form a pregnant electrolyte for said electrowinning process.

33. The process of claim 25 wherein the iron-rich bisulfite solution resulting from said aqueous $SO_2$ leaching is steam stripped to remove $SO_2$ therefrom and to precipitate ferrous monosulfite, the precipitated ferrous monosulfite is separated and calcined to form iron oxide and $SO_2$ gas.

34. The process of claim 33, wherein the iron oxide resulting from said calcining step is washed with ammoniacal ammonium carbonate solution to remove solubilizable metal impurities therefrom.

35. The process of claim 25 wherein said contact of said leach residue with aqueous $SO_2$ solution is effected at a temperature of about 50° to about 80° C. for at least about 30 minutes.

36. The process of claim 35 wherein said contact of said leach residue with aqueous $SO_2$ solution is effected at a temperature of about 65° to about 75° C.

37. The process of claim 35 wherein said contact of said leach residue with aqueous $SO_2$ solution is effected for about 30 minutes to about 6 hours.

38. The process of claim 1 wherein said zinc oxide and iron oxide values are removed simultaneously from said partially-desulfurized product by leaching the product with an aqueous acidic leachant, in which the zinc oxide and ferrous iron oxide values are soluble, to leave a leach residue comprising zinc sulfide values.

39. The process of claim 38 wherein said aqueous acidic leachant is dilute sulphuric acid.

40. The process of claim 1 wherein said iron-bearing zinc sulfide material is a zinc sulfide concentrate, said zinc sulfide concentrate is passed in contact with the oxidizing gas to effect a degree of elimination of sulfur therefrom such that, upon subsequent leaching of said partially-desulfurized product with ammoniacal ammonium carbonate solution to dissolve selectively zinc oxide values from the product in preference to iron oxide values and zinc sulfide values, there remains a leach residue wherein the Zn/S ratio is about 1.0.

41. The process of claim 40 wherein said partially-desulfurized product is leached with ammoniacal ammonium carbonate to selectively dissolve the zinc oxide values from the product so as to leave a leach residue containing iron oxide values and zinc sulfide values, and subsequently contacting said leach residue with a selective leachant for ferrous iron oxide values in preference to zinc sulfide values to dissolve said ferrous iron oxide values from the residue and leave a further residue comprising zinc sulfide.

42. The process of claim 41 wherein said selective leachant for ferrous iron oxide values is aqueous sulfur dioxide solution.

43. The process of claim 41 wherein said selective leachant for ferrous iron oxide values is a dilute sulphuric acid.

44. The process of claim 41 wherein said contacting of the zinc sulfide material with an oxidizing gas is carried out using a continuous contacting step in which particulated zinc sulfide concentrate is continuously fed to a bed of said particles fluidized in said oxidizing gas and particles of partially-desulfurized product are removed from said bed of particles after a residence time corresponding to the desired degree of desulfurization thereof, said degree of desulfurization is such that the zinc oxide values dissolved from said partially-desulfurized product constitute about 15 to about 20 wt. % of the total zinc values of said partially-desulfurized product, substantially none of the iron values are present as iron zincite complex, and said recycle of said further residue to the contacting step provides an overall continuous yield of zinc values in oxide form of at least about 95% of the zinc values in said concentrate.

45. The process of claim 1 wherein at least 95% of the iron values are in their ferrous forming said product mixture.

46. The process of claim 45 wherein at least 98% of the iron values are in their ferrous form in said product mixture.

* * * * *